United States Patent
Xie

(10) Patent No.: US 11,762,483 B2
(45) Date of Patent: Sep. 19, 2023

(54) MOUSE DEVICE

(71) Applicant: Primax Electronics Ltd., Taipei (TW)

(72) Inventor: Hong-Hiu Xie, Taipei (TW)

(73) Assignee: PRIMAX ELECTRONICS LTD., Taipei (TW)

(*) Notice: Subject to any disclaimer, the term of this patent is extended or adjusted under 35 U.S.C. 154(b) by 64 days.

(21) Appl. No.: 17/508,380

(22) Filed: Oct. 22, 2021

(65) Prior Publication Data

US 2022/0164041 A1 May 26, 2022

(30) Foreign Application Priority Data

Aug. 30, 2021 (CN) .......................... 202111002577.2

(51) Int. Cl.
*G06F 3/0354* (2013.01)
*G06F 3/03* (2006.01)
*F21V 33/00* (2006.01)
*F21Y 115/10* (2016.01)

(52) U.S. Cl.
CPC ...... *G06F 3/03543* (2013.01); *F21V 33/0052* (2013.01); *G06F 3/0308* (2013.01); *G06F 3/0317* (2013.01); *F21Y 2115/10* (2016.08); *G06F 2203/033* (2013.01); *G06F 2203/0337* (2013.01)

(58) Field of Classification Search
CPC .. G06F 3/03543; G06F 3/0308; G06F 3/0317; G06F 2203/033; G06F 2203/0337; F21V 33/0052; F21Y 2115/10
See application file for complete search history.

(56) References Cited

U.S. PATENT DOCUMENTS

2007/0057919 A1* 3/2007 Ng ...................... G06F 3/03543
345/166
2009/0316428 A1* 12/2009 Chang .................. G06F 3/0317
362/558

FOREIGN PATENT DOCUMENTS

TW M346863 U * 12/2008

* cited by examiner

*Primary Examiner* — Abhishek Sarma
(74) *Attorney, Agent, or Firm* — KIRTON McCONKIE; Evan R. Witt

(57) ABSTRACT

A mouse device includes a casing, a light-transmissible element and at least one light-emitting element. The casing has an opening. The light-transmissible element is disposed within the casing. A portion of the light-transmissible element is exposed outside the opening of the casing. The light-transmissible element includes plural scattering patterns. The at least one light-emitting element is disposed within the casing and located beside the light-transmissible element. The at least one light-emitting element emits a light beam to an internal portion of the light-transmissible element. After the light beam is transmitted through the plural scattering patterns, the light beam is scattered by the plural scattering patterns, and the scattered light beam is transmitted through the opening of the casing and outputted.

17 Claims, 5 Drawing Sheets

MOUSE DEVICE

FIELD OF THE INVENTION

The present invention relates to an input device, and more particularly to a mouse device.

BACKGROUND OF THE INVENTION

A mouse is used to control a cursor on a computer screen in order to operate the computer. Since 1968, the United States has produced the world's first mouse. After then, the mouse is applied to word processing operations, video games, industrial drawings, drawing design or media production. Consequently, the mouse has become an indispensable part of the computer system. In the early stage, the mouse device uses a trackball to detect the displacement of the mouse. With increasing development of science and technology, an optical module or a laser module is used to detect the displacement of the mouse device in order to enhance the working efficiency. Moreover, for increasing the functionality and convenience of the mouse device, the earliest wired single-button mouse device is gradually evolved into the modern wireless multi-button roller mouse device. For complying with different industrial needs or personal preferences, various electronic manufacturers have begun to create a variety of mouse device devices with different shapes in order to meet the operation requirements of different users.

Recently, for enhancing the visual beauty of the mouse appearance, various beautiful patterns are usually formed on the mouse casing through the cooperation of an engraving process and a paint-spraying process. Consequently, the user feels that the casing of the mouse shows a dazzling visual effect. Moreover, in addition to the cooperation of the engraving process and the paint-spraying process, the pattern can also be transferred to the mouse casing through a thermal transfer process. However, the patterns formed through the cooperation of the engraving process and the paint-spraying process or through the thermal transfer process are not light-transmissible. In addition, the patterns cannot be used with light-emitting elements to create more dazzling visual effects. Moreover, the cooperation of the engraving process and the paint-spraying process or the use of the thermal transfer process to form the patterns is very complicated and cumbersome. Consequently, the fabricating cost is largely increased.

Therefore, it is important to provide an improved mouse device in order to overcome the drawbacks of the conventional technologies.

SUMMARY OF THE INVENTION

The present invention provides a mouse device with a novel illuminating design in order to show a visually pleasing appearance.

The other objects and advantages of the present invention will be understood from the disclosed technical features.

In accordance with an aspect of the present invention, a mouse device is provided. The mouse device includes a casing, a light-transmissible element and at least one light-emitting element. The casing has an opening. The light-transmissible element is disposed within the casing. A portion of the light-transmissible element is exposed outside the opening of the casing. The light-transmissible element includes plural scattering patterns. The at least one light-emitting element is disposed within the casing and located beside the light-transmissible element. The at least one light-emitting element emits a light beam to an internal portion of the light-transmissible element. After the light beam is transmitted through the plural scattering patterns, the light beam is scattered by the plural scattering patterns, and the scattered light beam is transmitted through the opening of the casing and outputted.

In an embodiment, the casing includes an upper cover and a base, which are assembled with each other. Moreover, the opening is formed in the upper cover.

In an embodiment, the mouse device further includes a circuit board and a light shield structure. The circuit board installed on the base of the casing. The at least one light-emitting element is installed on the circuit board and electrically connected with the circuit board. The light shield structure is arranged between the opening of the upper cover and the circuit board. An accommodation space is defined by the light shield structure. The accommodation space is in communication with the opening. The light-transmissible element and the at least one light-emitting element are disposed within the accommodation space.

In an embodiment, the mouse device further includes a light-transmissible plate, and the light-transmissible plate is installed on the upper cover of the casing. The opening of the upper cover is covered by the light-transmissible plate. The light-transmissible plate and the light-transmissible element are contacted with each other. The scattered light beam is sequentially transmitted through the opening and the light-transmissible plate and outputted.

In an embodiment, the light-transmissible element further includes a light output part and a light input part, which are opposed to each other. The plural scattering patterns are arranged between the light output part and the light input part. The light output part is exposed outside the opening of the upper cover and contacted with the light-transmissible plate. The light input part includes a recess. The at least one light-emitting element is disposed within the recess.

In an embodiment, the light-transmissible plate includes plural phosphors and plural reflective decoration structures.

In an embodiment, the at least one light-emitting element includes plural light-emitting elements, and the plural light-emitting elements are light emitting diode chips corresponding to different light colors.

In an embodiment, the plural scattering patterns of the light-transmissible element are plural linear engraved structures in a radial arrangement, and the plural scattering patterns are formed by a laser engraving process.

In an embodiment, the light-transmissible element further includes plural phosphors and plural reflective decoration structures.

In an embodiment, the light-transmissible element is made of glass, crystal, polystyrene, polyethylene, polymethyl methacrylate, polycarbonate, polyethylene terephthalate, polyvinyl chloride, polypropylene or polyamide.

In accordance with another aspect of the present invention, a mouse device is provided. The mouse device includes a casing, a light-transmissible element and at least one light-emitting element. The casing has an opening. The light-transmissible element is disposed within the casing. A portion of the light-transmissible element is exposed outside the opening of the casing. The light-transmissible element includes plural flexible light-guiding units. The at least one light-emitting element is disposed within the casing and located beside the light-transmissible element. The at least one light-emitting element emits a light beam to an internal portion of the light-transmissible element. After the light beam is transmitted through the plural light-guiding units, the light beam is outputted from the opening of the casing.

In an embodiment, the casing includes an upper cover and a base, which are assembled with each other. Moreover, the opening is formed in the upper cover.

In an embodiment, the mouse device further includes a circuit board and a light shield structure. The circuit board installed on the base of the casing. The at least one light-emitting element is installed on the circuit board and electrically connected with the circuit board. The light shield structure is arranged between the opening of the upper cover and the circuit board. An accommodation space is defined by the light shield structure. The accommodation space is in communication with the opening. The light-transmissible element and the at least one light-emitting element are disposed within the accommodation space.

In an embodiment, the mouse device further includes a light-transmissible plate, and the light-transmissible plate is installed on the upper cover of the casing. The opening of the upper cover is covered by the light-transmissible plate. The light-transmissible plate and the light-transmissible element are contacted with each other. The light beam is sequentially transmitted through the opening and the light-transmissible plate and outputted.

In an embodiment, the light-transmissible element further includes a light output part and a light input part, which are opposed to each other. The plural flexible light-guiding units are arranged between the light output part and the light input part. The light output part is exposed outside the opening of the upper cover and contacted with the light-transmissible plate. The light input part includes a recess. The at least one light-emitting element is disposed within the recess.

In an embodiment, the light-transmissible plate includes plural phosphors and plural reflective decoration structures.

In an embodiment, the at least one light-emitting element includes plural light-emitting elements, and the plural light-emitting elements are light emitting diode chips corresponding to different light colors.

In an embodiment, the flexible light-guiding units of the light-transmissible element are linear structures, and the plural flexible light-guiding units are made of liquid silicone rubber or optical fiber.

In an embodiment, the light-transmissible element further includes plural phosphors and plural reflective decoration structures.

In an embodiment, the light-transmissible element further includes a receiving space, and the plural flexible light-guiding units are disposed within the receiving space.

From the above descriptions, the present invention provides the mouse device. The internal portion of the casing is equipped with the light-transmissible element having the scattering patterns or the flexible light-guiding units. After the light-transmissible element is illuminated by the light-emitting element, the scattering patterns or the flexible light-guiding units in the light-transmissible element can provide a visual effect like auroral illumination or a visual effect like the ocean wave motion. Moreover, the light-transmissible plate covering the outer side of the casing comprises plural phosphors and plural reflective decoration structures. When the light beam from the light-emitting element is transmitted through the light-transmissible plate, a visual effect like the glorious starry sky is provided. Moreover, the method of installing the scattering patterns or the flexible light-guiding units in the light-transmissible element and the method of installing the phosphors and the reflective decoration structures in the light-transmissible plate are very simple while achieving the good visual effects. Consequently, the fabricating cost can be effectively reduced.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the figures being described. The components of the present invention may be located in a number of different orientations. As such, the directional terminology is used for purposes of illustration and is in no way limiting.

Figure 1:
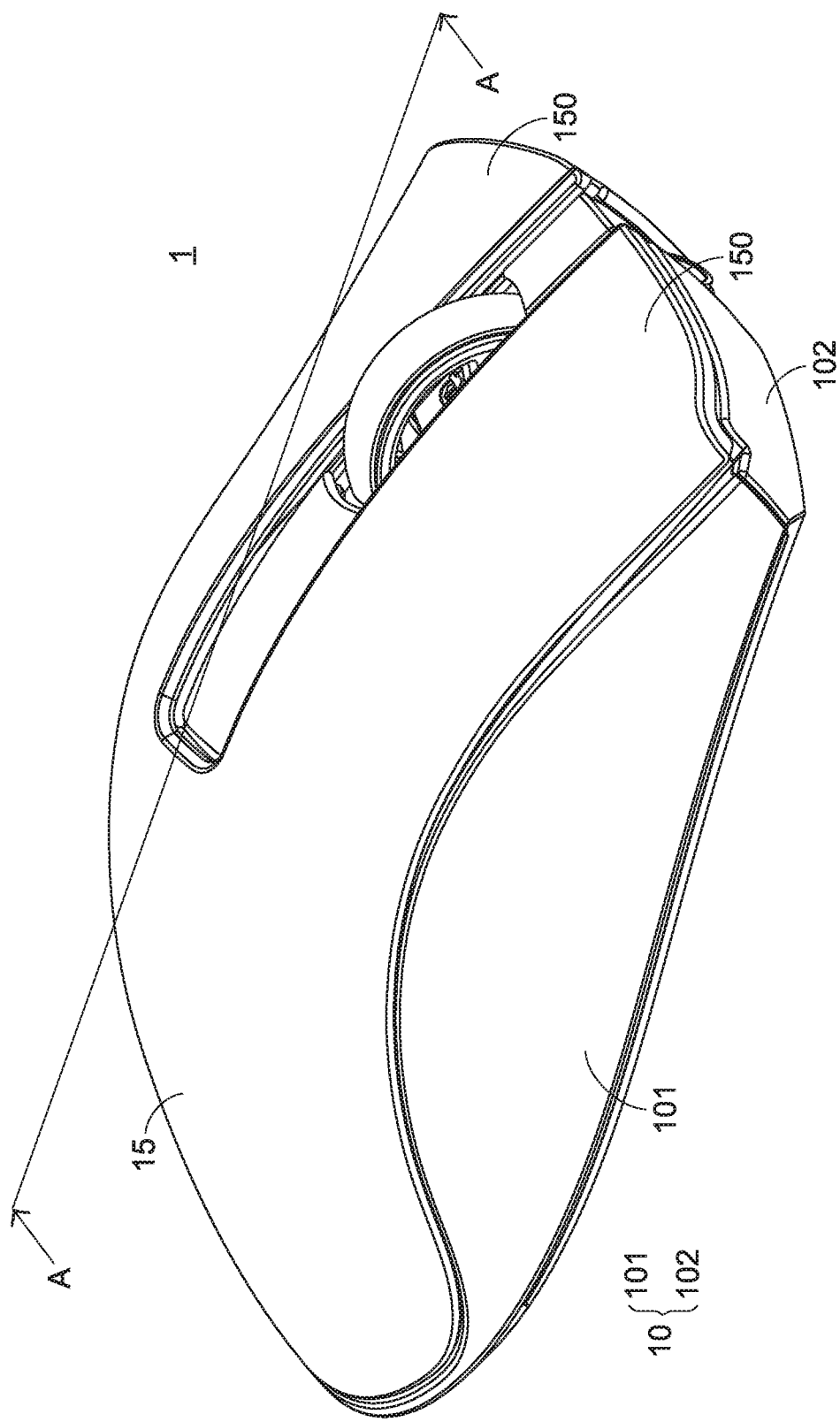
FIG. 1 is a schematic perspective view illustrating the appearance of a mouse device according to an embodiment of the present invention.
Figure 2:
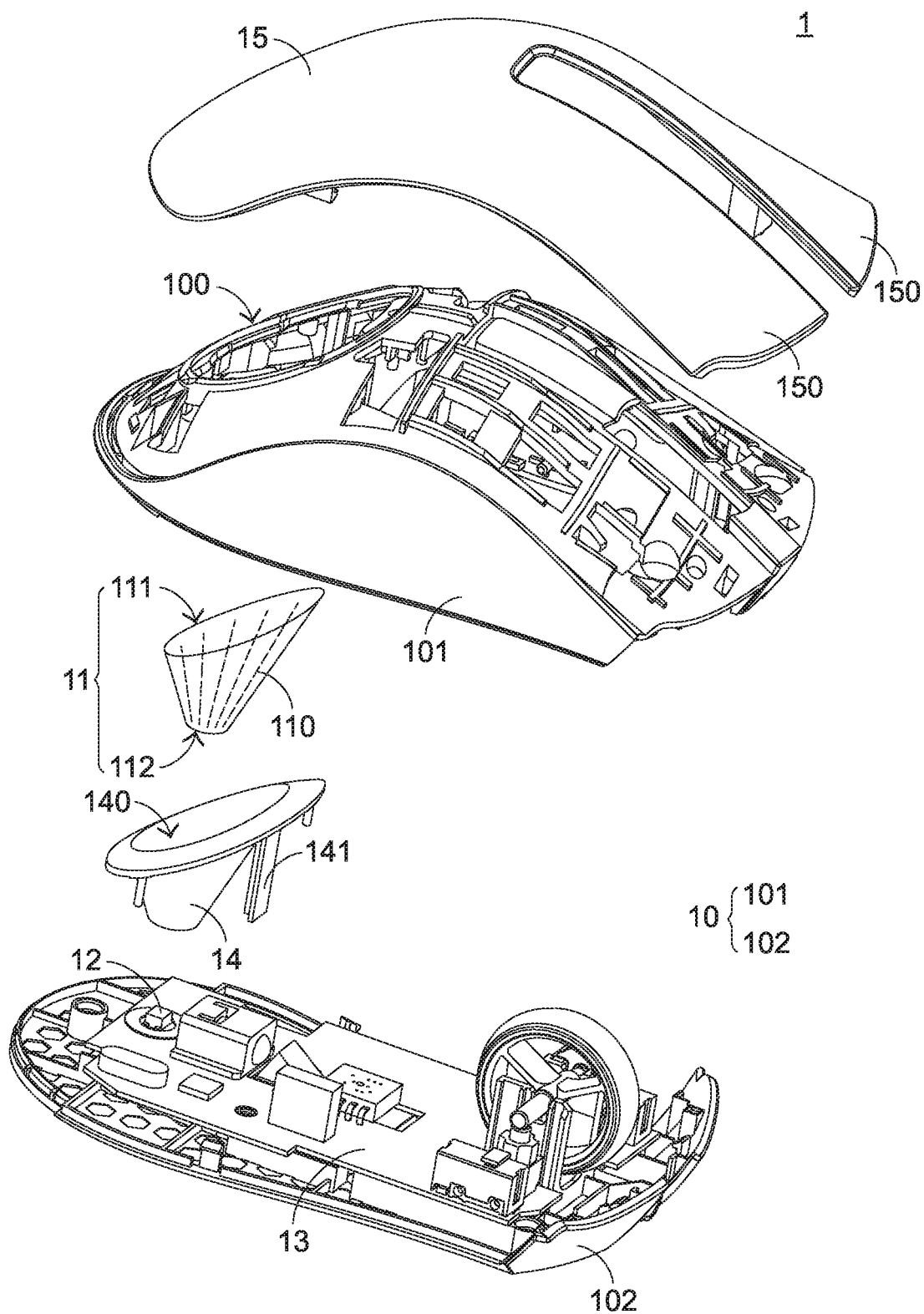
FIG. 2 is a schematic exploded view illustrating the mouse device as shown in FIG. 1.
Figure 3:
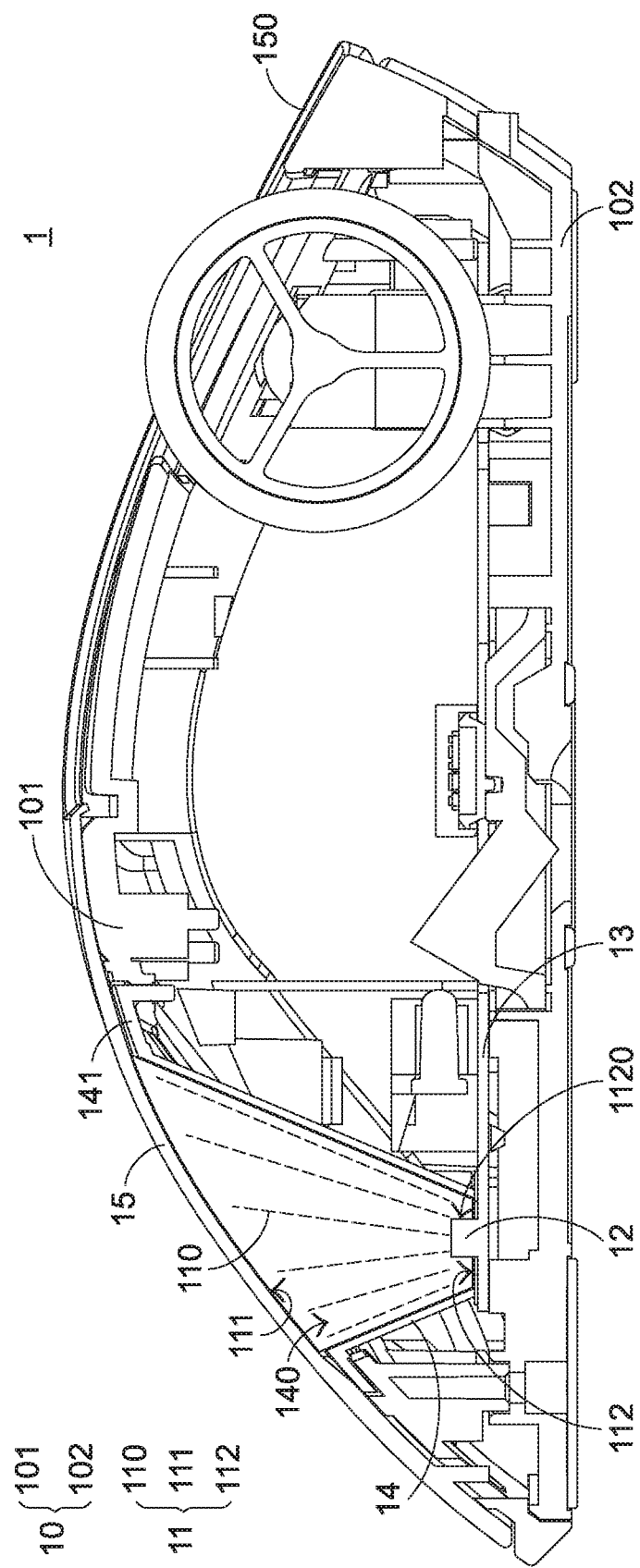
FIG. 3 is a schematic cross-sectional view illustrating the mouse device as shown in FIG. 1 and taken the line AA.
Figure 4:
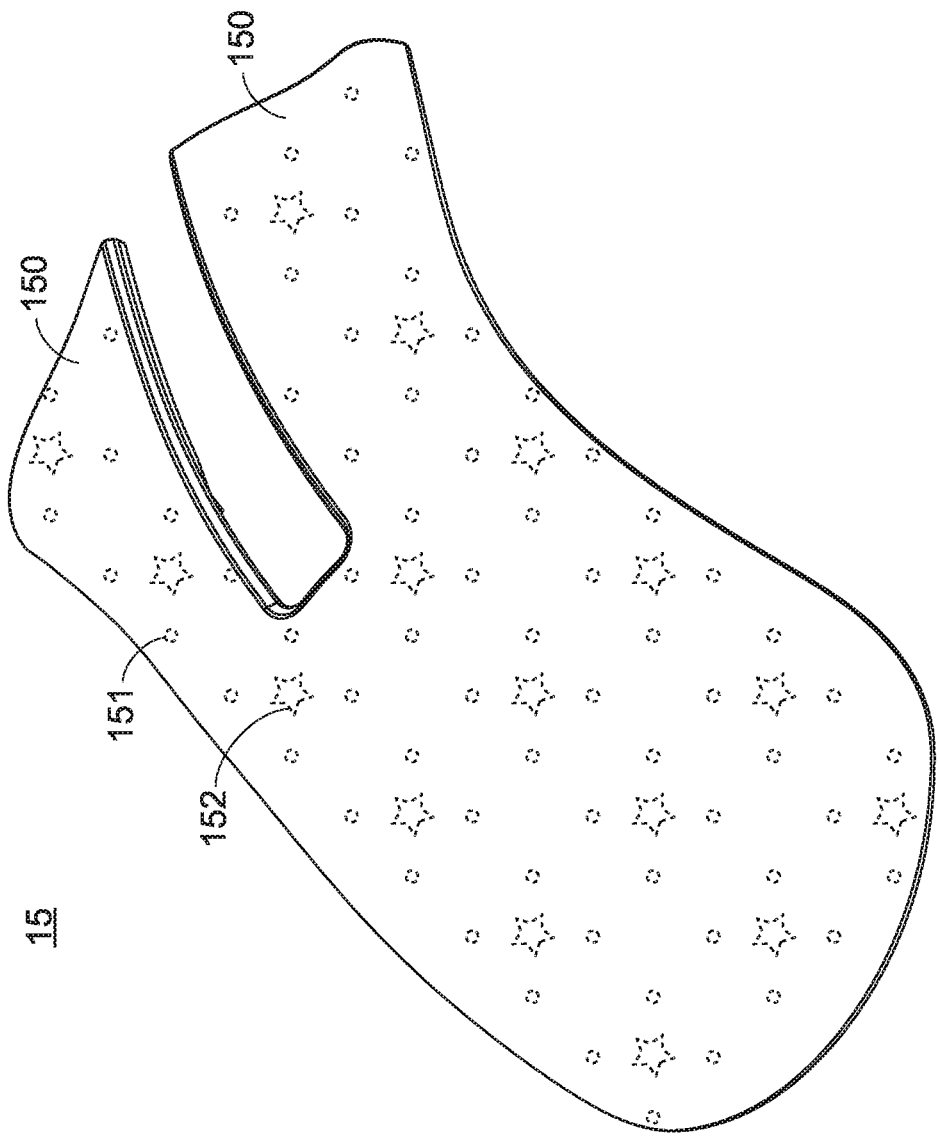
FIG. 4 is a schematic perspective view illustrating the detailed structure of the light-transmissible plate of the mouse device as shown in FIG. 1.

Please refer to FIGS. 1, 2, 3 and 4. FIG. 1 is a schematic perspective view illustrating the appearance of a mouse device according to an embodiment of the present invention. FIG. 2 is a schematic exploded view illustrating the mouse device as shown in FIG. 1. FIG. 3 is a schematic cross-sectional view illustrating the mouse device as shown in FIG. 1 and taken the line AA. FIG. 4 is a schematic perspective view illustrating the detailed structure of the light-transmissible plate of the mouse device as shown in FIG. 1.

As shown in FIGS. 1, 2 and 3, the mouse device 1 comprises a casing 10, a light-transmissible element 11 and at least one light-emitting element 12. The casing 10 comprises an opening 100. The light-transmissible element 11 is disposed within the casing 10. In addition, a portion of the light-transmissible element 11 is exposed outside the opening 100. The light-transmissible element 11 comprises plural scattering patterns 110. The light-emitting element 12 is disposed within the casing 10. In addition, the light-emitting element 12 is located beside the light-transmissible element 11. The light-emitting element 12 emits a light beam to the internal portion of the light-transmissible element 11. The light beam is transmitted through the scattering patterns 110, which are formed in the internal portion of the light-transmissible element 11. When the light beam is transmitted through the scattering patterns 110, the light beam is scattered by the scattering patterns 110. In addition, the scattered light beam is transmitted through the opening of the casing 100 and outputted.

In an embodiment, the scattering pattern 110 is an engraved structure that is formed in the internal portion of the light-transmissible element 11 by a laser engraving process. In addition, these scattering patterns 110 are plural linear engraved structures in a radial arrangement. It is noted that the shapes of the scattering patterns 110 are not restricted. The shapes of the scattering patterns 110 may be varied according to the practical requirements and the customized demands.

As mentioned above, the scattering patterns 110 are plural linear engraved structures in a radial arrangement. Consequently, when the light beam from the light-emitting element 12 is transmitted through the scattering patterns 110 and scattered by the scattering patterns 110, the scattering patterns 110 can provide a visual effect like auroral illumination.

In an embodiment, the light-transmissible element 11 is made of crystal. It is noted that the example of the material of the light-transmissible element 11 is not restricted. For example, in another embodiment, the light-transmissible element 11 is made of glass, polystyrene (PS), polyethylene (PE), polymethyl methacrylate (PMMA), polycarbonate (PC), polyethylene terephthalate (PET), polyvinyl chloride (PVC), polypropylene (PP) or polyamide (PA).

The detailed structure of the mouse device 1 will be described as follows.

Please refer to FIGS. 1, 2 and 3 again. In an embodiment, the casing 10 comprises an upper cover 101 and a base 102, which are assembled with each other. The opening 100 is formed in the upper cover 101. Moreover, the mouse device 1 further comprises a circuit board 13 and a light shield structure 14. The circuit board 13 is installed on the base 102 of the casing 10. The light-emitting element 12 is installed on the circuit board 13 and electrically connected with the circuit board 13. The light shield structure 14 is arranged between the opening 100 of the upper cover 101 and the circuit board 13. In addition, an accommodation space 140 is defined by the light shield structure 14. The accommodation space 140 is in communication with the opening 100. However, the accommodation space 140 is not in communication with internal space of the casing 10. The light-transmissible element 11 and the light-emitting element 12 are disposed within the accommodation space 140 of the light shield structure 14. Moreover, an external side of the light shield structure 14 is connected with a bracket 141. The light shield structure 14 is supported by the bracket 141. Consequently, the light shield structure 14 can be securely fixed in the region between the opening 100 of the upper cover 101 and the circuit board 13. Especially, the light shield structure 14 provides the following efficacy. After the light beam from the light-emitting element 12 is introduced into the light-transmissible element 11 and scattered by the scattering patterns 110, the light beam scattered to all directions is hindered by the light shield structure 14 and not leaked to the internal space of the casing 10. Consequently, the light beam can be well transferred to the opening 100 of the casing 10.

Please refer to FIGS. 1, 2, 3 and 4. In an embodiment, the mouse device 1 further comprises a light-transmissible plate 15. The light-transmissible plate 15 is installed on the upper cover 101 of the casing 10. The opening 100 of the upper cover 101 is covered by the light-transmissible plate 15. Especially, the light-transmissible plate 15 and the portion of the light-transmissible element 11 exposed outside the opening 100 are contacted with each other. After the light beam from the light-emitting element 12 is introduced into the light-transmissible element 11 and scattered by the scattering patterns 110, the scattered light beam is sequentially transmitted through the opening 100 of the upper cover 101 and the light-transmissible plate 15 and outputted. In an embodiment, the light-transmissible plate 15 is a button plate with plural buttons 150. The buttons 150 can be pressed and operated by the user. When one of the plural buttons 150 is pressed down by the user, a switch (not shown) corresponding to the pressed button 150 is triggered. Consequently, the circuit board 13 electrically connected with the switch generates a button signal. The button signal is transmitted to a computing device (not shown) that is connected with the mouse device 1. Consequently, the computing device executes a command or a function corresponding to the button signal.

As shown in FIGS. 2 and 3, the light-transmissible element 11 further comprises a light output part 111 and a light input part 112, which are opposed to each other. The scattering patterns 110 of the light-transmissible element 11 are arranged between the light output part 111 and the light input part 112. The light output part 111 of the light-transmissible element 11 is exposed outside the opening 100 of the upper cover 101 and contacted with the light-transmissible plate 15. The light input part 112 of the light-transmissible element 11 comprises a recess 1120. The light-emitting element 12 is disposed within the recess 1120 of the light input part 112. The light beam emitted by the light-emitting element 12 is introduced into the light-transmissible element 11 through the light output part 111 of the light-transmissible element 11. After the light beam is introduced into the light-transmissible element 11 and scattered by the scattering patterns 110, the scattered light beam is exited from the light output part 111 of the light-transmissible element 11 and sequentially transmitted from the opening 100 of the upper cover 101 and the light-transmissible plate 15.

As mentioned above, after the light beam is scattered by the scattering patterns 110, the light beam is transmitted through the opening 100 of the upper cover 101 and the light-transmissible plate 15 sequentially. Consequently, when the mouse device 1 is used, the scattering patterns 110 provide the visual effect like auroral illumination. In other words, the user can clearly view that the visual effect like auroral illumination is shown the light-transmissible plate 15.

Please refer to FIGS. 1, 2, 3 and 4 again. The light-transmissible plate 15 comprises plural phosphors 151 and plural reflective decoration structures 152. After the light beam from the light-emitting element 12 is scattered by the scattering patterns 110, the scattered light beam is projected to the light-transmissible plate 15. When the scattered light beam is transmitted through the light-transmissible plate 15, the phosphors 151 are excited by the light beam, and the scattered light beam is reflected by the plural reflective decoration structures 152. Consequently, a visual effect like the glorious starry sky is provided. In an embodiment, each of the plural reflective decoration structures 152 has the star-shaped appearance. It is noted that the shapes of the reflective decoration structures 152 are not restricted. The shapes of the reflective decoration structures 152 may be varied according to the visual effect to be shown.

In an embodiment, the phosphors 151 are yellow phosphors, and the at least one light-emitting element 12 comprises plural light-emitting elements 12. These light-emitting elements 12 are light emitting diode chips for emitting light beams with different light colors. For example, the light-emitting elements 12 include blue light emitting diode chips, red light emitting diode chips and green light emitting diode chips. The yellow phosphors and different color light beams from the different color light emitting diode chips cooperatively work to provide the desired luminous effect. For example, after the yellow phosphors are excited by the blue light beams from the blue light emitting diode chips, the blue light beams and the yellow light beams are mixed as the high-brightness white light according to the complementary color theory. It is noted that the types of the phosphors 151 are not restricted. The phosphors 151 with different colors may be selected according to the practical requirements.

In an embodiment, the mouse device 1 is equipped with a hard switch (not shown). By adjusting the hard switch, the light emitting diode chips with the corresponding colors are switched and enabled to emit the corresponding light beams. For example, the mouse device 1 is switched to emit the light beam with a single light color or emit the mixed light of two color light beams. Alternatively, when an application program is extended, a command is transmitted to the mouse device 1. Consequently, the light emitting diode chips with the corresponding colors are switched and enabled to emit the corresponding light beams.

As mentioned above, the scattering pattern 110 is an engraved structure that is formed in the internal portion of the light-transmissible element 11 by a laser engraving process. It is noted that numerous modifications and alterations may be made while retaining the teachings of the invention. For example, in another embodiment, the internal portion of the light-transmissible element 11 is equipped with the phosphors or reflective decoration structures, which are similar to those mentioned above. Consequently, more diversified visual effects can be provided.

Figure 5:
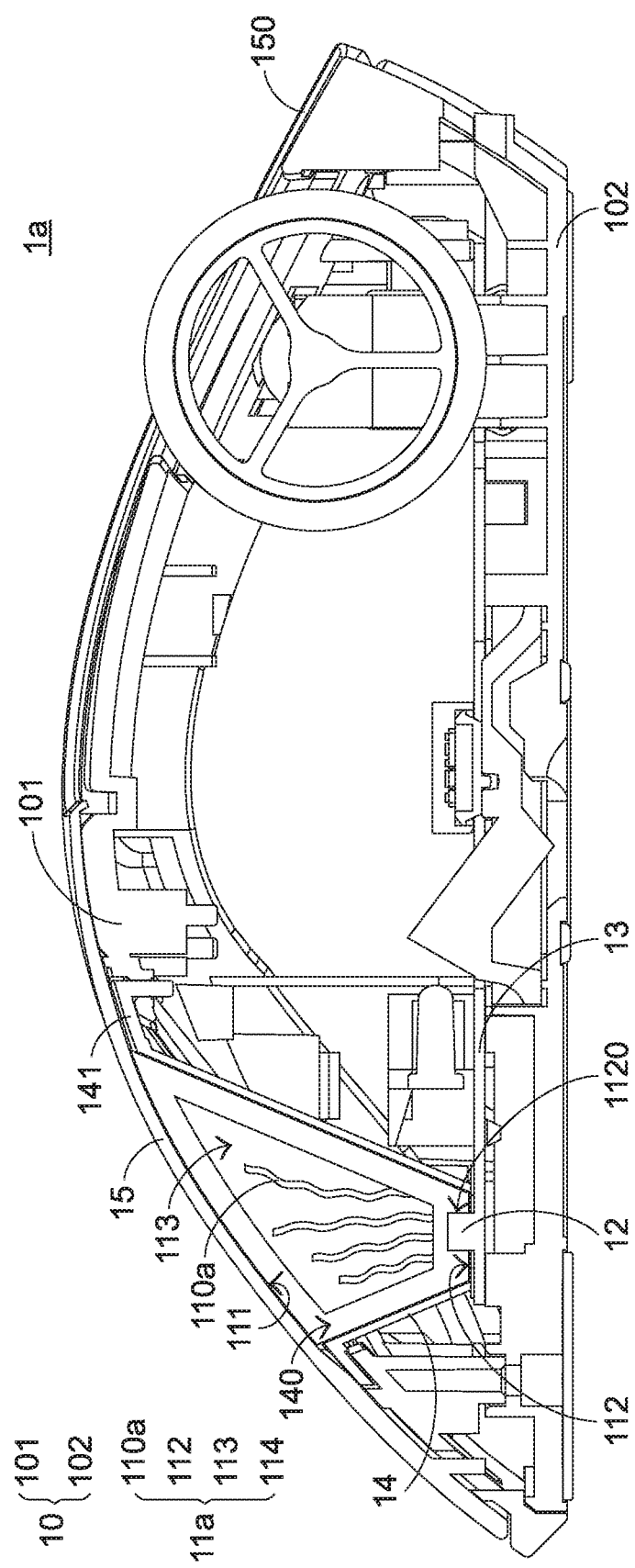
FIG. 5 is a schematic cross-sectional view illustrating a mouse device according to another embodiment of the present invention.

FIG. 5 is a schematic cross-sectional view illustrating a mouse device according to another embodiment of the present invention. The structures of the mouse device 1a of this embodiment are similar to those of the mouse device 1 as shown in FIGS. 1, 2 and 3. In comparison with the mouse device 1, the light-transmissible element 11a of the mouse device 1a of this embodiment further comprises plural flexible light-guiding units 110a. As shown in FIG. 5, the light-transmissible element 11a is installed in the casing 10. A portion of the light-transmissible element 11a is exposed outside the opening 100 of the casing 10. In addition, the internal portion of the light-transmissible element 11a comprises a receiving space 113. These flexible light-guiding units 110a are disposed within the receiving space 113. After the light beam emitted by the light-emitting element 12 is introduced into the light-transmissible element 11a through the light output part 111 of the light-transmissible element 11a, the light beam is guided by the flexible light-guiding units 110a and exited from the flexible light-guiding units 110a. After the light beam is guided by the flexible light-guiding units 110a, the light beam is transmitted through the opening 100 of the upper cover 101 and the light-transmissible plate 15 sequentially.

In an embodiment, the flexible light-guiding units 110a are linear structures. It is noted that the shapes of the flexible light-guiding units 110a are not restricted. The shapes of the flexible light-guiding units 110a may be varied according to the practical requirements and the customized demands. Since the flexible light-guiding units 110a are linear structures, a special visual effect can be provided. For example, after the light beam from the light-emitting element 12 is guided by the flexible light-guiding units 110a and exited from the flexible light-guiding units 110a, the movement of the mouse device 1a in a forward direction, a backward direction, a leftward direction or a rightward direction by the user may cause the flexible light-guiding units 110a to be correspondingly swung within the receiving space 113 of the light-transmissible element 11a. Consequently, a visual effect like the ocean wave motion is provided.

In an embodiment, the flexible light-guiding units 110a are made of optical fiber. It is noted that the material of the flexible light-guiding units 110a is not restricted. For example, in some other embodiment, the flexible light-guiding units 110a are made of thermosetting liquid silicone rubber (LSR) or thermoplastic elastomer.

From the above descriptions, the present invention provides the mouse device. The internal portion of the casing is equipped with the light-transmissible element having the scattering patterns or the flexible light-guiding units. After the light-transmissible element is illuminated by the light-emitting element, the scattering patterns or the flexible light-guiding units in the light-transmissible element can provide a visual effect like auroral illumination or a visual effect like the ocean wave motion. Moreover, the light-transmissible plate covering the outer side of the casing comprises plural phosphors and plural reflective decoration structures. When the light beam from the light-emitting element is transmitted through the light-transmissible plate, a visual effect like the glorious starry sky is provided. Moreover, the method of installing the scattering patterns or the flexible light-guiding units in the light-transmissible element and the method of installing the phosphors and the reflective decoration structures in the light-transmissible plate are very simple while achieving the good visual effects. Consequently, the fabricating cost can be effectively reduced.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all modifications and similar structures.

What is claimed is:

1. A mouse device, comprising:
   a casing having an opening, wherein the casing comprises an upper cover and a base, which are assembled with each other, wherein the opening is formed in the upper cover;
   a light-transmissible element disposed within the casing, wherein a portion of the light-transmissible element is exposed outside the opening of the casing, and the light-transmissible element comprises plural scattering patterns;
   at least one light-emitting element disposed within the casing, and located beside the light-transmissible element, wherein the at least one light-emitting element emits a light beam to an internal portion of the light-transmissible element, wherein after the light beam is transmitted through the plural scattering patterns, the light beam is scattered by the plural scattering patterns, and the scattered light beam is transmitted through the opening of the casing and outputted;
   a circuit board installed on the base of the casing, wherein the at least one light-emmitting element is installed on the circuit board and electrically connected with the circuit board; and
   a light shield structure arranged between the opening of the upper cover and the circuit board, wherein an accommodation space is defined by the light shield structure, and the accommodation space is in communication with the opening, wherein the light-transmissible element and the at least one light-emmitting element are disposed within the accommodation space.

2. The mouse device according to claim 1, wherein the at least one light-emitting element comprises plural light-emitting elements, and the plural light-emitting elements are light emitting diode chips corresponding to different light colors.

3. The mouse device according to claim 1, wherein the plural scattering patterns of the light-transmissible element are plural linear engraved structures in a radial arrangement, and the plural scattering patterns are formed by a laser engraving process.

4. The mouse device according to claim 1, wherein the light-transmissible element further comprises plural phosphors and plural reflective decoration structures.

5. The mouse device according to claim 1, wherein the light-transmissible element is made of glass, crystal, polystyrene, polyethylene, polymethyl methacrylate, polycarbonate, polyethylene terephthalate, polyvinyl chloride, polypropylene or polyamide.

6. A mouse device, comprising:
    a casing having an opening;
    a light-transmissible element disposed within the casing, wherein a portion of the light-transmissible element is exposed outside the opening of the casing, and the light-transmissible element comprises plural scattering patterns; and
    at least one light-emitting element disposed within the casing, and located beside the light-transmissible element, wherein the at least one light-emitting element emits a light beam to an internal portion of the light-transmissible element, wherein after the light beam is transmitted through the plural scattering patterns, the light beam is scattered by the plural scattering patterns, and the scattered light beam is transmitted through the opening of the casing and outputted,
    wherein the plural scattering patterns of the light-transmissible element are plural linear engraved structures in a radial arrangement, and the plural scattering patterns are formed by a laser engraving process.

7. The mouse device according to claim 1, wherein the mouse device further comprises a light-transmissible plate, and the light-transmissible plate is installed on the upper cover of the casing, wherein the opening of the upper cover is covered by the light-transmissible plate, and the light-transmissible plate and the light-transmissible element are contacted with each other, wherein the scattered light beam is sequentially transmitted through the opening and the light-transmissible plate and outputted.

8. The mouse device according to claim 7, wherein the light-transmissible element further comprises a light output part and a light input part, which are opposed to each other, wherein the plural scattering patterns are arranged between the light output part and the light input part, the light output part is exposed outside the opening of the upper cover and contacted with the light-transmissible plate, the light input part comprises a recess, and the at least one light-emitting element is disposed within the recess.

9. The mouse device according to claim 7, wherein the light-transmissible plate comprises plural phosphors and plural reflective decoration structures.

10. The mouse device according to claim 6, wherein the casing comprises an upper cover and a base, which are assembled with each other, wherein the opening is formed in the upper cover.

11. The mouse device according to claim 10, wherein the mouse device further comprises:
    a circuit board installed on the base of the casing, wherein the at least one light-emitting element is installed on the circuit board and electrically connected with the circuit board; and
    a light shield structure arranged between the opening of the upper cover and the circuit board, wherein an accommodation space is defined by the light shield structure, and the accommodation space is in communication with the opening, wherein the light-transmissible element and the at least one light-emitting element are disposed within the accommodation space.

12. The mouse device according to claim 10, wherein the mouse device further comprises a light-transmissible plate, and the light-transmissible plate is installed on the upper cover of the casing, wherein the opening of the upper cover is covered by the light-transmissible plate, and the light-transmissible plate and the light-transmissible element are contacted with each other, wherein the scattered light beam is sequentially transmitted through the opening and the light-transmissible plate and outputted.

13. The mouse device according to claim 12, wherein the light-transmissible element further comprises a light output part and a light input part, which are opposed to each other, wherein the plural scattering patterns are arranged between the light output part and the light input part, the light output part is exposed outside the opening of the upper cover and contacted with the light-transmissible plate, the light input part comprises a recess, and the at least one light-emitting element is disposed within the recess.

14. The mouse device according to claim 12, wherein the light-transmissible plate comprises plural phosphors and plural reflective decoration structures.

15. The mouse device according to claim 6, wherein the at least one light-emitting element comprises plural light-emitting elements, and the plural light-emitting elements are light emitting diode chips corresponding to different light colors.

16. The mouse device according to claim 6, wherein the light-transmissible element further comprises plural phosphors and plural reflective decoration structures.

17. The mouse device according to claim 6, wherein the light-transmissible element is made of glass, crystal, polystyrene, polyethylene, polymethyl methacrylate, polycarbonate, polyethylene terephthalate, polyvinyl chloride, polypropylene or polyamide.

* * * * *